United States Patent [19]

Barrows

[11] Patent Number: 4,626,013
[45] Date of Patent: Dec. 2, 1986

[54] DUAL AXIS GRIPPER

[75] Inventor: Burton F. Barrows, Mount Dora, Fla.

[73] Assignee: General Electric Company, Charlottesville, Va.

[21] Appl. No.: 680,414

[22] Filed: Dec. 11, 1984

[51] Int. Cl.⁴ ............................................. B25J 15/00
[52] U.S. Cl. ..................... 294/88; 294/86.4; 294/103.1; 294/902; 414/736; 414/741; 901/14; 901/31; 901/39
[58] Field of Search .................. 294/86.4, 86.41, 87.1, 294/88, 103.1, 902; 29/568; 269/268–271, 902; 414/736, 741; 901/14, 17–19, 27, 30–32, 36–39, 50

[56] References Cited

U.S. PATENT DOCUMENTS

| | | | |
|---|---|---|---|
| 2,811,267 | 10/1957 | Bock | 414/736 X |
| 3,029,489 | 4/1962 | Nelson | 269/269 X |
| 3,572,519 | 3/1971 | Tezuka | 901/14 X |
| 3,682,327 | 8/1972 | Winne | 901/37 X |
| 3,777,902 | 12/1973 | Potter | 414/741 |
| 4,093,081 | 6/1978 | Yver | 901/31 X |
| 4,336,926 | 6/1982 | Inagaki et al. | 901/17 X |
| 4,425,073 | 1/1984 | Matteson | 294/103.1 X |

FOREIGN PATENT DOCUMENTS

| | | | |
|---|---|---|---|
| 114096 | 7/1984 | European Pat. Off. | 901/31 |
| 2041262 | 9/1980 | United Kingdom | 901/37 |

Primary Examiner—Johnny D. Cherry
Attorney, Agent, or Firm—James H. Beusse; Irving M. Freedman

[57] ABSTRACT

A dual axis gripper for use with a robot arm having a rotatable wrist is provided with a first and second gripper. A bracket couples the first gripper to the robot arm in line with an axis about which one form of robot wrist rotation occurs. The bracket also couples a second gripper to the robot arm perpendicular to the first axis of rotation. The wrist rotation also includes rotation about a horizontal axis perpendicular to the first axis of rotation. Both the grippers are provided with a fixed jaw and a linearly actuated movable jaw so that both grippers form compliant type grippers. By rotating the grippers through the first axis of rotation and about the second axis of rotation, the two grippers may interchange positions and are capable of moving parts between any locations within a defined work envelope adjacent the end of the robot arm.

6 Claims, 2 Drawing Figures

DUAL AXIS GRIPPER

BACKGROUND OF THE INVENTION

This invention relates to grippers for use with industrial robots.

Robots in industry today are used mostly to handle pieces, parts, equipment and material. Of critical importance in the design of a gripper for material handling is cycle time. When loading and unloading a machine with a robot, a short cycle time means a more effective utilization of the machine.

The use of a single gripper on a robot arm avoids the need of designing special multipurpose grippers. However, a single gripper might require the use of reorientation stands when transferring parts from one location to another, since motion limitations on how a single gripper may grasp a part does not permit the part to be picked up in the same orientation as required for insertion in a machine. Part reorientation results in an increase in cycle time.

In five axis robots with grippers in line with the robot arm, the parts feeder and the point of insertion of the part (machine chuck jaws, pallet, assembly fixture) must be along the center line of the robot arm. The center line restriction of five axis robots results in large space requirements when laying out the robot parts feeder and point of insertion, which in turn creates space problems particularly in retrofitting a robotic system with an existing machining center.

In handling a variety of parts using a single robot arm, the robot gripper and/or gripper fingers need to be changed, requiring a large inventory of specially designed grippers and/or fingers and incurring the associated retooling time.

Grippers normally have a parallel or a scissors arrangement with two moving surfaces coming together to grasp a part. Grippers of this type do not have compliance, that is, the ability to effectively grasp and hold any part within the full range of the grippers closing motion. When operating a robot with two moving jaws in a teach mode many attempts are required to properly position the gripper with the part precisely centered so that upon closing the grippers the part does not move. The motion of a robot arm has a repeatability typically of 0.005 of an inch, but centering a part by eye can typically be done only within 0.030 of an inch.

It is an object of the present invention to provide a gripper with compliance to eliminate many gripper and/or gripper finger changes.

It is a further object of the present invention to provide a multiple gripper for a 5 axis robot to eliminate the center line restriction for obtaining parts from a parts feeder and for part insertion.

It is still a further object of the present invention to provide a gripper which usually eliminates the need for part reorientation and achieves the accompanying reduction in cycle time.

It is another object of the present invention to provide a gripper which allows precise gripper positioning relative to the part to be grasped when operating the robot arm in a teach mode.

SUMMARY OF THE INVENTION

In one aspect of the present invention a dual axis gripper for use with a robot arm having a rotatable wrist is provided having a first and second gripper means. Bracket means couple the first gripper means to the robot arm in line with the axis about which the robot wrist rotation occurs. The bracket means also couples the second gripper means to the robot arm perpendicular with the axis about which the wrist rotates.

In another aspect of the present invention, a gripper for use with a robot arm is provided, comprising an overarm including a first member ending in an integral fixed jaw having a gripping surface and moveable jaw means including a gripping surface. Linear actuator means are provided for urging the moveable jaw means towards to and away from the fixed jaw, with the contact surface of the fixed jaw and the moveable jaw means remaining parallel to one another. Means for securing the linear actuator means to the robot arm and means for mounting the overarm to the means for securing the linear actuator means are also provided.

BRIEF DESCRIPTION OF THE DRAWING

While the specification concludes with claims particularly pointing and distinctly claiming the present invention, the objects and advantages can be more readily ascertained from the following description of preferred embodiments when used in conjunction with the accompanying drawing in which:

DETAILED DESCRIPTION OF THE DRAWING

Figure 1:
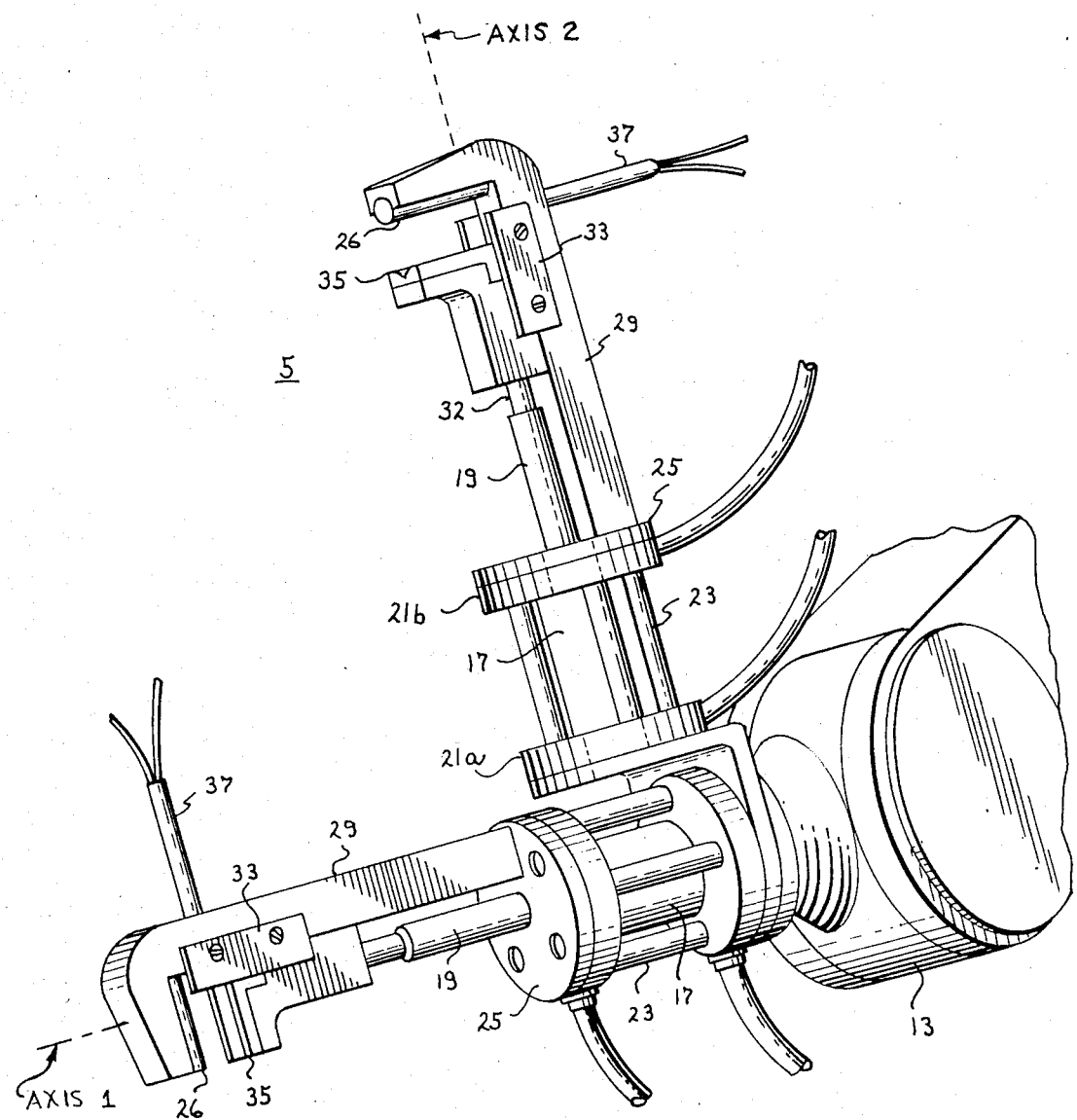
FIG. 1 is a perspective view of a dual axis linear gripper in accordance with the present invention.

Referring now to the drawing in which alike numerals refer to like elements throughout, and particularly FIG. 1 thereof, a dual axis gripper 5 is shown. The dual axis gripper comprises a mounting bracket 11 formed from aluminum angle stock. The mounting bracket has two plates 11a and 11b forming a 90° angle relative to one another. Plate 11a is mounted on a robot arm 13 with one side of the plate 11a bolted to the robot arm by bolts 12. The bolt arrangement can be seen in FIG. 2. Secured to the other side of plate 11a in line with the axis of rotation of the robot wrist by bolts 14 is a first gripper assembly.

Figure 2:
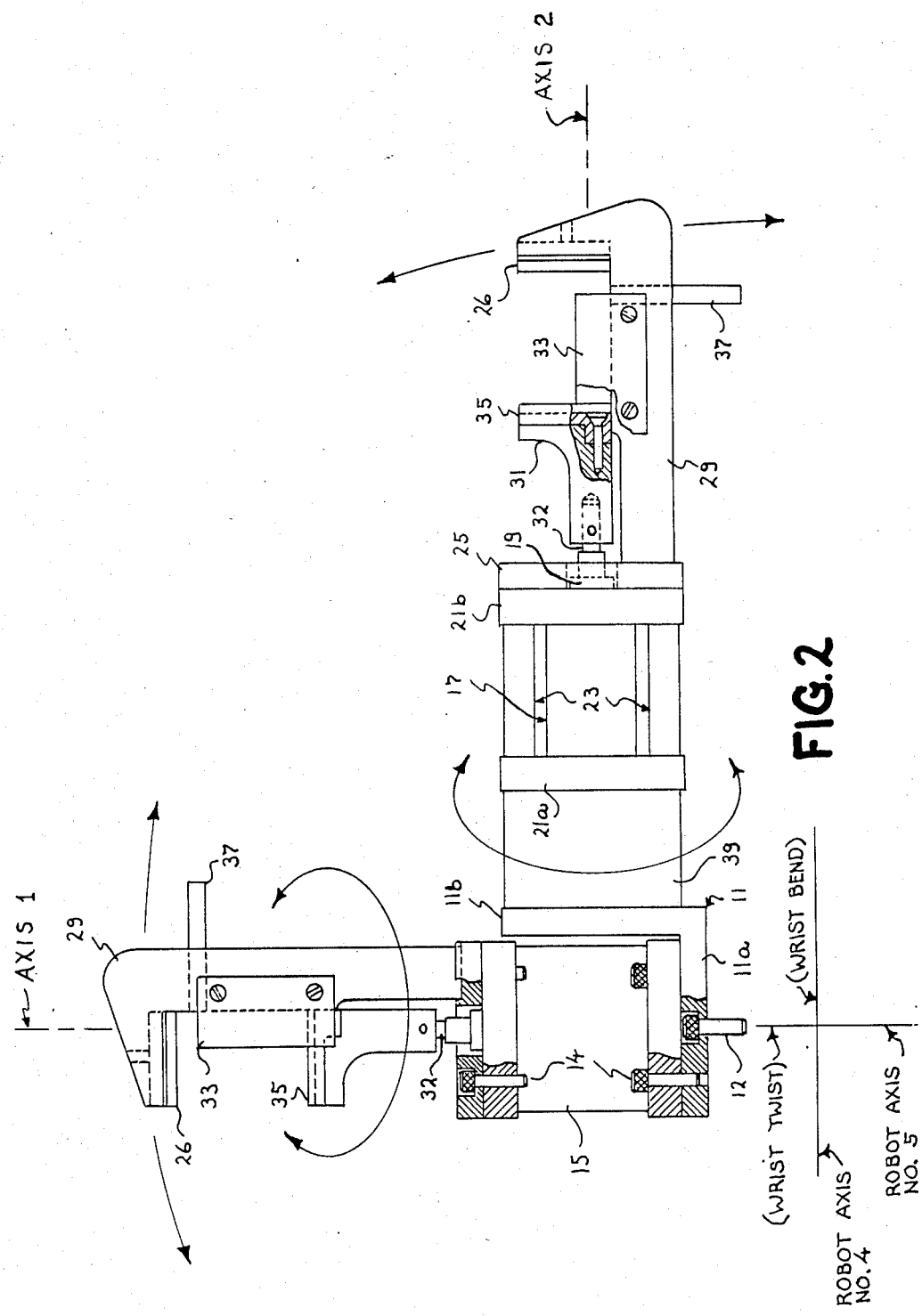
FIG. 2 is a side view with cut away sections of another embodiment of a dual axis linear gripper in accordance with the present invention.

The first gripper assembly comprises a linear actuator which urges gripper jaws into and out of contact. In a preferred embodiment the linear actuator comprises an air cylinder assembly 15 which moves a linear jaw gripper. The air cylinder assembly comprises a double acting air cylinder 17 with a single rod end 19, which is mounted between two parallel disk shaped aluminum flanges 21a and 21b, respectively. Flanges 21a and 21b are held together by four aluminum tie rods 23 equally spaced circumferencially about the flanges and adjacent the edge of the flanges, forming a squirrel cage arrangement. A port in the edge of the flanges 21a and 21b permits compressed air to be introduced by hoses to move the piston inside the air cylinder and thereby move the rod end in and out of the cyinder. An air cylinder assembly of this type is available for example, from Bimba Manufacturing Company, Monee, Ill. as model FO-17-2.0-3. Flange 21a is bolted to plate 11a as can be seen in FIG. 2. Flange 21b has a centrally located axially extending aperture permitting air cylinder rod 19 to extend therethrough.

An aluminum disk 25 has one side bolted flush to flange 21b. Disk 25 has a centrally located axially extending aperture to permit a threaded rod (not shown) to extend through the disk and engage a threaded recess in rod end 19. Disk 25 has a radially extending slot adjacent to the disk periphery on the side of the disk opposite the side bolted to the flange. The base portion of an overarm 29 fits into the slot and the base of the slot is secured in the slot in a suitable manner such as welding. The overarm extends perpendicular to the plane of disk 25 ending in an integral fixed jaw having a gripping surface. The gripping surface extends parallel to the plane of disk 25 and extends over the center portion of the disk. The gripping surface comprises a jaw insert 26 which in the preferred embodiment is a rod of material secured to the fixd jaw by a bolt extending through the overarm and engaging the insert. The longitudinal axis of the rod is parallel to the plane of disk 25. The material of the insert is dependent on the part material to be grasped, with a brass insert, for example, suitable for an aluminum part.

A moveable jaw 31 has a base portion with a threaded recess into which the threaded rod 32 is engaged. The moveable jaw when urged by the rod of the air cylinder, slides along in a channel formed by a portion of the overarm that extends perpendicularly from the plane of disk 25 and guides 33 secured to overarm 29 and extending on either side of the moveable jaw. The moveable jaw has a gripping surface which comprises in the preferred embodiment an insert 35 having a rectangular block of material with a "V" shaped channel. The gripping surfaces of the moveable and stationary jaws remain parallel with one another when the moveable jaw is moved towards and away from the fixed jaw.

The rectangular insert with the "V" shaped slot and the rod shaped insert are aligned so that on closing the jaws the rod rests in the "V" shaped notch. A proximity switch 37 for determining when a part is positioned between the jaws, extends through an aperture in the portion of the overarm extending perpendicular to the plane of disk 25. The aperture opens into the channel in which the moveable jaw slides and the aperture is positioned adjacent to the fixed jaw contact surface so that when large or small parts are grasped they will be close to the proximity detector.

Secured to plate 11b on the side forming a 270° angle with plate 11a is a second gripper assembly, identical to the first gripper assembly. The open jaw on the first gripper assembly faces away from a plane passing through plate 11b. The open jaw on the second gripper assembly faces away from the plane of plate 11a.

Referring now to FIG. 2 another embodiment of a dual axis gripper is shown. The embodiment of FIG. 2 differs from the embodiment of FIG. 1 in that a direct drive DC motor 39 is provided in the second gripper assembly. The DC motor is a servo actuator which can be directly attached to the load it drives. An example of a suitable DC motor is available from Inland Motor Industrial Drive Division of Kollmorgen Corporation, Radford, VA Model No. NT 1308. The stator position of the motor containing the permanent magnet field is affixed to the bracket. The rotor is mounted on bearings secured to the bracket. The flange of the air cylinder is secured to the rotor permitting air cylinder and gripper assembly rotation about the longitudinal axis of the gripper.

The operation of a dual axis gripper of FIG. 1 will now be explained. Compressed air supplied selectively to the two ports on each of the two cylinders is independently controlled for each of the grippers by a programmable controller such as a General Electric Series 6 Programmable Controller. The dual axes of the gripper are shown in FIG. 1, with the axis labeled axis 1 coincident with the fifth axis which is the wrist twist axis of a five axis robot. The axis labeled axis 2 extends through the second gripper assembly. The first gripper assembly has the capability of rotating around its longitudinal axis (roll) to the full limit of the robot's movement (360° for a General Electric P5 Robot). Rotation around an axis normal to the first gripper assembly longitudinal axis occurs with rotation about the robots wrist bend axis (pitch) or axis 4. The first gripper however is not capable of yaw motion about an axis perpendicular to the robot twist and wrist bend axes. The second gripper assembly cannot rotate around its longitudinal axis but can be rotated around the axis normal to its longitudinal axis to the full limit of the rotation of the robot wrist.

The flexibility added by the second gripper assembly permits the robot to pick up and/or place parts within its range of motion without the restriction common to five axis robots that the feeder and the point of insertion be on the center line of the robot arm. Eliminating the center line restriction permits the location of the robot at almost any point within the space envelope and allows parts to be fed into the cell at almost any point within the envelope reducing the total space requirements. The two grippers can reduce cycle time by bringing a part to be machined to the machining center, removing the completed part with the other gripper and placing the part to be machined into the machining center jaws.

In selecting an air cylinder with a stroke appropriate to the parts to be handled, the user can effectively incorporate an optimum degree of compliance into the gripper function. Compliance, in this sense, is defined as the ability of the gripper to grasp and hold any part within the full range of its linear motion. Weight compliance (i.e. needing the force requirement imposed on the gripper by the weight of the part to be handled) is obtained from the choice of the air cylinder diameter consistent with the available air pressure.

The jaw inserts provide three point contact with the part being handled. Plastic inserts can be used for glass parts while brass inserts can be used with aluminum parts.

The fixed and moveable jaw configuration permits the programmer to bring the fixed jaw into direct contact with the part to be handled and teaching that point, enabling the jaws to close on the part with repeatability and without displacing the part.

The embodiment of FIG. 2 is capable of all the operation of the embodiment of FIG. 1 and has the added capability of rotating the second gripper assembly about axis 2 which extends longitudinally through the second gripper assembly. The gripper of FIG. 2 effectively provides six axis capability to a five axis robot, permitting a part anywhere in the work space to be grasped.

The foregoing describes a multiple gripper for a five axis robot which eliminates the center line restriction for picking up and placing parts. A gripper is also described which has compliance to eliminate many gripper and/or gripper finger changes and allows precise gripper positioning relative to the part to be grasped when operating the robot in the teach mode.

While the invention has been particularly shown and described with reference to preferred embodiments thereof, it will be understood by those skilled in the art that various changes in form and detail may be made without departing from the spirit and scope of the invention.

What is claimed is:

1. A dual axis gripper for use with a robot arm for part manipulation, the arm having a first rotatable wrist arranged for rotation about a horizontal first axis passing perpendicularly through an end of the arm and a second rotatable wrist coupled to said first wrist and arranged for rotation about a second axis perpendicular to and passing through the horizontal first axis, the gripper comprising:

first and second gripper means; and bracket means for coupling said first gripper means to the robot arm colinear with the second axis and for coupling said second gripper means to the robot arm perpendicular to the second axis said first and second gripper means being conjointly rotatable about the first axis, said first gripper means being rotatable about the second axis such that a part held by said first gripper means is rotated about an axis passing through the part, and said second gripper means being rotatable about the second axis such that a part held by said second gripper means is rotated in a plane normal to the first axis and at a constant radial dimension from the first axis.

2. The dual axis gripper of claim 1 wherein said first and second gripper means each comprise:

an overarm having a first member ending in a fixed jaw, said jaw having a gripping surface;

moveable jaw means having a gripping surface;

linear actuator means for urging said moveable jaw means towards and away from said fixed jaw, with the gripping surfaces of the fixed jaw and moveable jaw means remaining parallel to one another;

means for securing said linear actuator means to the robot arm; and means for mounting said overarm to said means for securing said linear actuator means.

3. The gripper of claim 2 wherein said fixed jaw gripping surface is substantially at right angles with said first member.

4. A dual axis gripper for use with a robot arm for part manipulation, the arm having a first rotatable wrist arranged for rotation about a horizontal first axis passing perpendicularly through an end of the arm and a second rotatable wrist coupled to said first wrist and arranged for rotation about a second axis perpendicular to and passing through the horizontal first axis, the gripper comprising:

first and second gripper means;

means for rotating said second gripper means; and bracket means for coupling said first gripper means to the robot arm colinear with the second axis and for coupling said means for rotating said second gripper means to said first gripper means so that said second gripper means extends perpendicular to the second axis and said second gripper means is rotatable about a longitudinal axis passing therethrough and perpendicular to the second axis.

5. The dual axis gripper of claim 4 wherein said first and second gripper means each comprise:

an overarm having a first member ending in a fixed jaw, said jaw having a gripping surface;

movable jaw means having a gripping surface;

linear actuator means for urging said movable jaw means towards and away from said fixed jaw with the gripping surfaces of the fixed jaw and moveable jaw means remaining parallel to one another;

means for securing said linear actuator means to the robot arm; and means for mounting said overarm to said means for securing said linear actuator means.

6. The gripper of claim 5 wherein said fixed jaw gripping surface is substantially at right angles with said first member.

* * * * *